US012504599B2

(12) United States Patent
Isaka

(10) Patent No.: US 12,504,599 B2
(45) Date of Patent: Dec. 23, 2025

(54) APPARATUS AND IMAGE PICKUP APPARATUS

(71) Applicant: CANON KABUSHIKI KAISHA, Tokyo (JP)

(72) Inventor: Mitsuhiro Isaka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 772 days.

(21) Appl. No.: 17/462,571

(22) Filed: Aug. 31, 2021

(65) Prior Publication Data

US 2022/0075138 A1  Mar. 10, 2022

(30) Foreign Application Priority Data

Sep. 7, 2020 (JP) ................................ 2020-149590

(51) Int. Cl.
*G02B 7/02* (2021.01)
*H04N 5/225* (2006.01)
*H04N 23/55* (2023.01)

(52) U.S. Cl.
CPC ............. *G02B 7/023* (2013.01); *H04N 23/55* (2023.01)

(58) Field of Classification Search
CPC .......... G02B 7/02; G02B 7/021; G02B 7/023; G02B 7/026; G02B 7/04; H04N 5/225; H04N 5/2252; H04N 5/2254; H04N 5/2257; H04N 23/55; G03B 17/12; G03B 17/08; G03B 3/02; G03B 2217/002
USPC ....... 359/808, 818, 819, 611, 703, 704, 740, 359/830
See application file for complete search history.

(56) References Cited

U.S. PATENT DOCUMENTS

| 5,777,801 A | * | 7/1998 | Takemae | .................. | G02B 7/10 |
| | | | | | 359/703 |
| 2004/0223074 A1 | * | 11/2004 | Takada | .................. | H04N 23/54 |
| | | | | | 348/360 |
| 2018/0364448 A1 | * | 12/2018 | Tanaka | .................. | G02B 7/102 |

FOREIGN PATENT DOCUMENTS

| JP | 2004295119 | * | 10/2004 | ............... G02B 7/02 |
| JP | 2004295119 A | | 10/2004 | |
| JP | 2010117552 A | | 5/2010 | |
| JP | 2011033885 A | | 2/2011 | |
| JP | 4956680 B2 | | 6/2012 | |
| JP | 2016048292 A | | 4/2016 | |

OTHER PUBLICATIONS

English translation of JP 2004295119. (Year: 2004).*

* cited by examiner

*Primary Examiner* — Jie Lei
(74) *Attorney, Agent, or Firm* — Canon U.S.A., Inc. IP Division

(57) ABSTRACT

An apparatus includes a lens, a holder, and a retainer. The lens is held with the lens being pressed against the holder by the retainer in a direction parallel to an optical axis of the lens. The lens includes a first outer periphery, a second outer periphery, a first contact portion in contact with the holder, and a second contact portion in contact with the retainer. In a direction orthogonal to the optical axis, the first outer periphery, the first contact portion and the second contact portion are arranged farther away from the optical axis than the second outer periphery. The holder is configured to hold the lens such that the holder is fitted to the second outer periphery and is not in contact with the first outer periphery.

15 Claims, 7 Drawing Sheets

APPARATUS AND IMAGE PICKUP APPARATUS

BACKGROUND OF THE DISCLOSURE

Field of the Disclosure

The aspect of the embodiments relates to an apparatus and an image pickup apparatus.

Description of the Related Art

There is a case where a hood or an optical accessory is attached to an outer periphery of a front end of a lens apparatus. A structure for attaching the hood is, for example, such that an inner periphery of the hood is fitted to the outer periphery and then a screw provided in the hood is tightened to urge the inner periphery against the outer periphery in a direction orthogonal to an optical axis. In this structure, an external member of the lens apparatus can be deformed due to the tightening of the screw. If the external member and a holding frame for a lens unit are integrated so that the lens apparatus has a smaller diameter or a smaller number of components, the deformation of the external member may deform the lens unit, resulting in changed optical performance.

Japanese Patent Application Laid-Open No. 2016-048292 discusses a lens barrel including an intermediate member that is formed of a resin material and is arranged between a holding frame and a lens. In addition, Japanese Patent No. 4956680 discusses a structure for supporting an optical element, which includes a plate spring member between a holding frame and a supporting member that supports the holding frame. Furthermore, Japanese Patent Application Laid-Open No. 2011-033885 discusses a lens apparatus in which a front frame is fixed to an outer periphery of a holding frame, and a hood is attached to an outer periphery of the front frame.

The configuration discussed in Japanese Patent Application Laid-Open No. 2016-048292 and the configuration discussed in Japanese Patent No. 4956680 require the intermediate member or the plate spring member in addition to the holding frame, and thus are disadvantageous due to a complex structure (the number of components). The configuration discussed in Japanese Patent Application Laid-Open No. 2011-033885 is disadvantageous in terms of the external diameter of the lens apparatus because the front frame is fixed to the outer periphery of the holding frame.

SUMMARY OF THE DISCLOSURE

An aspect of embodiments provides an apparatus includes a lens, a holder, and a retainer. The lens is held with the lens being pressed against the holder by the retainer in a direction parallel to an optical axis of the lens. The lens includes a first outer periphery, a second outer periphery, a first contact portion in contact with the holder, and a second contact portion in contact with the retainer. In a direction orthogonal to the optical axis, the first outer periphery, the first contact portion and the second contact portion are arranged farther away from the optical axis than the second outer periphery. The holder is configured to hold the lens such that the holder is fitted to the second outer periphery and is not in contact with the first outer periphery.

Further features of the disclosure will become apparent from the following description of exemplary embodiments with reference to the attached drawings.

DESCRIPTION OF THE EMBODIMENTS

Figure 1:
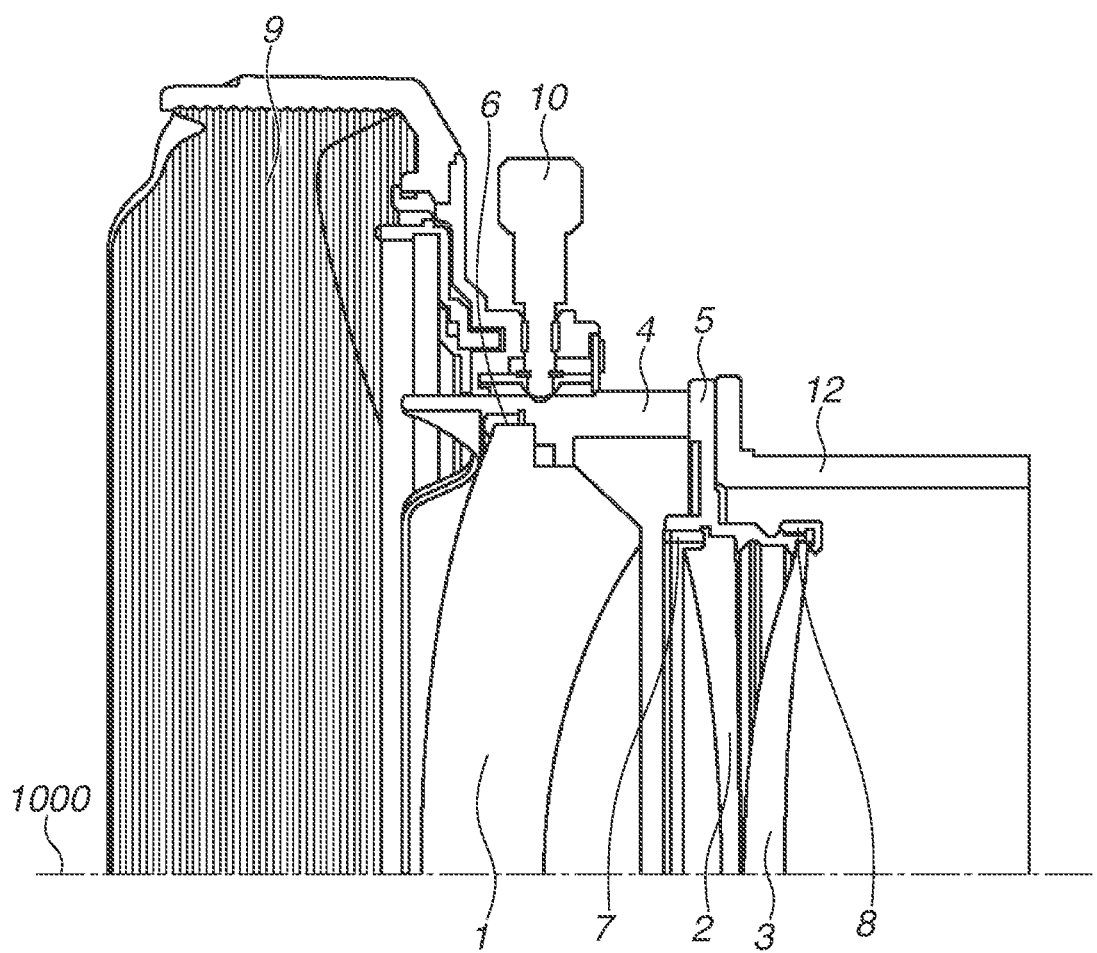
FIG. 1 is a sectional view illustrating a main part of a lens apparatus according to a first exemplary embodiment.

Exemplary embodiments of the disclosure will be described with reference to the accompanying drawings. In principle (Unless otherwise specified), the same members or the like are denoted by the same reference numerals throughout all the drawings for illustrating the exemplary embodiments, and the redundant description thereof will be omitted.

FIG. 1 is a sectional view illustrating a main part of a lens apparatus according to a first exemplary embodiment. In FIG. 1, the lens apparatus includes a lens 1. The term "lens" refers to not only a single lens, but also a lens unit including a plurality of lenses. A holding frame 4 (also referred to as a holding member or holder) holds the lens 1. The lens 1 is fitted to the holding frame 4. A retaining member 6 (also referred to as a retainer) is screwed to the holding frame 4 and retains the lens 1. The lens 1 is held by the holding frame 4 while being retained (while being urged against the holding frame 4) by the retaining member 6 in a direction parallel to an optical axis 1000. A holding frame 5 holds lenses 2 and 3. Retaining members 7 and 8 are screwed to the holding frame 5. The lenses 2 and 3 are held by the holding frame 5 while being retained (while being urged against the holding frame 5) by the retaining members 7 and 8, respectively, in the direction parallel to the optical axis 1000. The holding frames 4 and 5 are fixed to a fixed barrel 12, for example, with screws. A hood 9 is attached to the lens apparatus by being fitted to an outer periphery of the holding frame 4.

Figure 2:
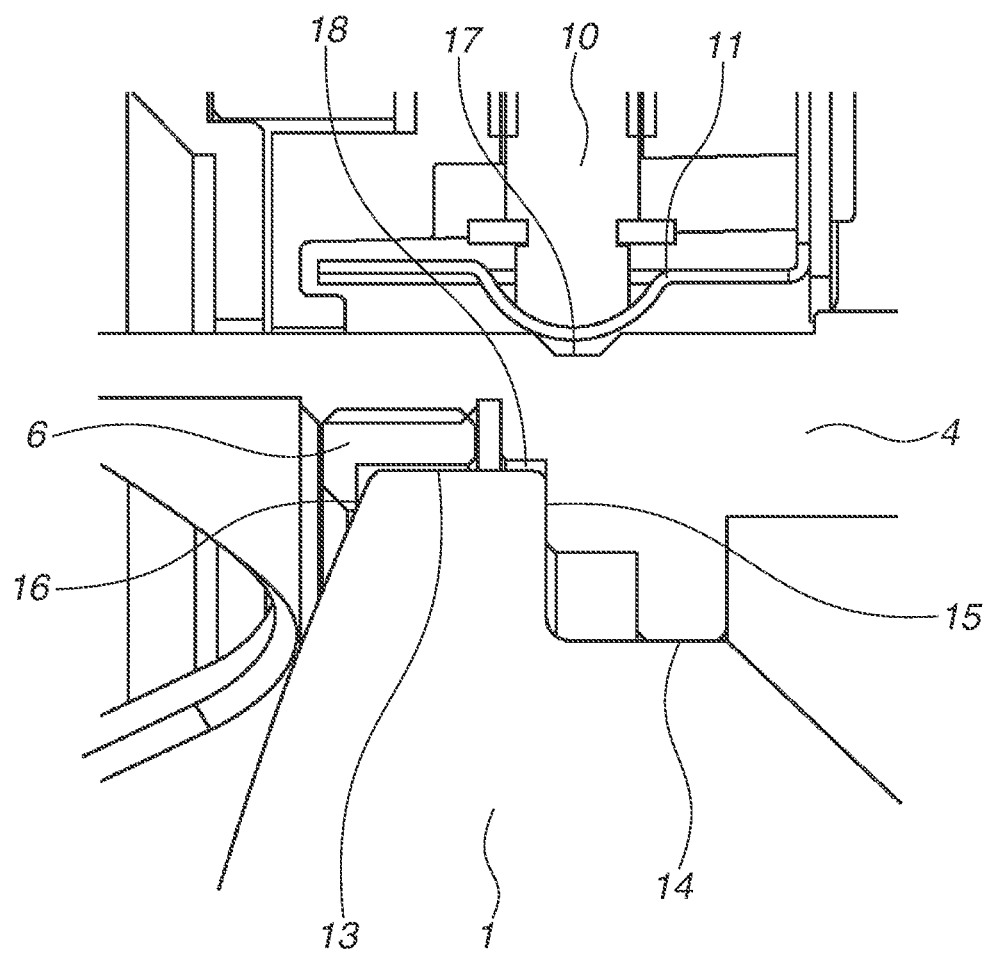
FIG. 2 is an enlarged view of a portion including a holding member in the main part of the lens apparatus according to the first exemplary embodiment.

FIG. 2 is an enlarged view of a portion including the holding member in the main part of the lens apparatus. In FIG. 2, the lens 1 fitted to a fitting portion of the holding frame 4 includes a first outer periphery 13 and a second outer periphery 14. The lens 1 further includes a first contact portion 15 and a second contact portion 16. The first contact portion 15 is in contact with the holding frame 4 while being pressed against the holding frame 4 (the holding member) by the retaining member 6. The second contact portion 16 is in contact with the retaining member 6. In the direction orthogonal to the optical axis 1000 of the lens 1, the first outer periphery 13, the first contact portion 15, and the second contact portion 16 are arranged farther away from the optical axis 1000 than the second outer periphery 14. The holding frame 4 is fitted to the second outer periphery 14 of the lens 1, and holds the lens 1 so as not to be in contact with the first outer periphery 13 of the lens 1.

The holding frame 4 includes a pressed portion 17 (a first pressed portion) configured to be pressed in a direction toward the optical axis 1000 in the direction orthogonal to the optical axis 1000, by a pressing member in the accessory (the hood 9 in this example) to be attached to the outside of the holding frame 4. More specifically, tightening a screw 10 provided in the hood 9 urges the pressing member (a plate 11 in this example) against the pressed portion 17 (the first pressed portion) including a recessed portion or a groove portion in the holding frame 4, and fixes the hood 9 to the holding frame 4. At this time, the tightening of the screw 10 applies an external force to the pressed portion 17 of the holding frame 4 in the direction orthogonal to the optical axis 1000, and the external force deforms the holding frame 4. The deformation (distortion) of the holding frame 4 deforms (distorts) the lens 1, which can lower the optical performance of the lens apparatus. In a conventional lens apparatus, the fitting portion of the holding frame 4 holds the lens 1 at the first outer periphery 13 that has the largest external diameter with respect to the optical axis 1000. In contrast, the lens apparatus according to the present exemplary embodiment is provided with the second outer periphery 14 having an external diameter smaller than the external diameter of the first outer periphery 13, and has the structure in which the fitting portion is fitted to the lens 1 at the second outer periphery 14.

Figure 3:
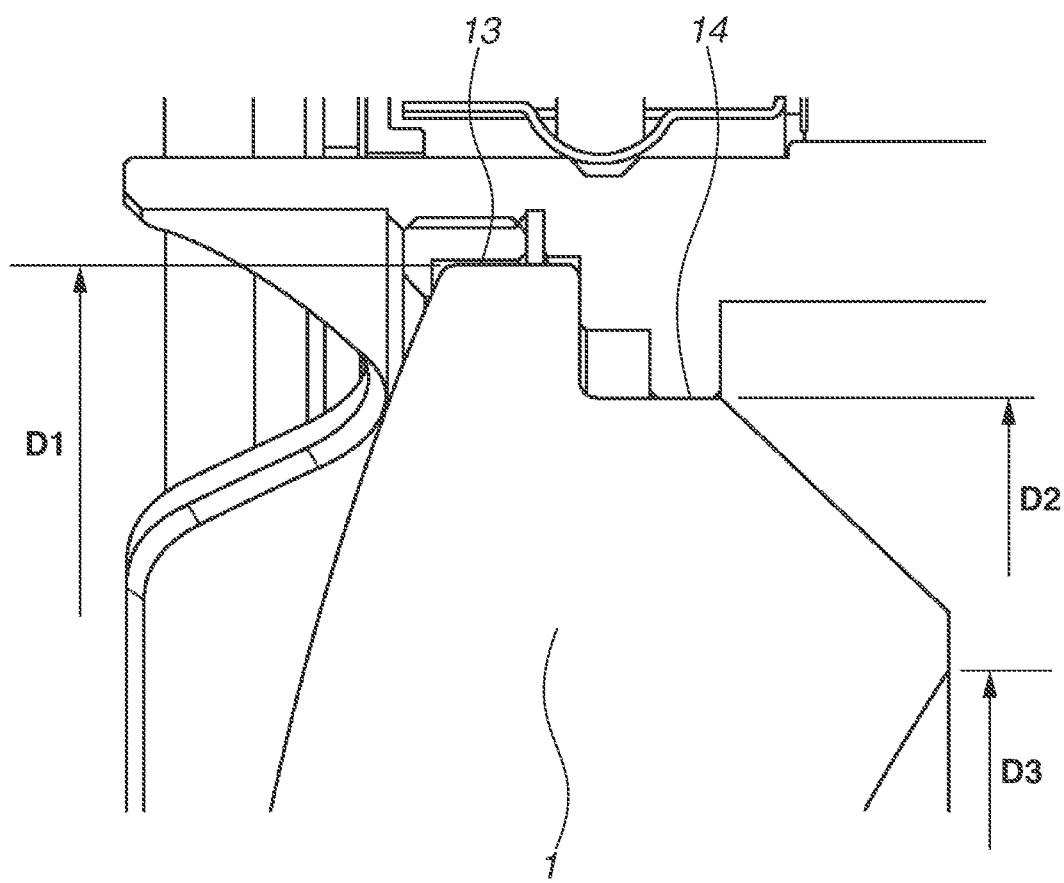
FIG. 3 is a sectional view illustrating a conditional expression with respect to an external diameter of each outer periphery according to the first exemplary embodiment.

FIG. 3 is a sectional view illustrating a conditional expression with respect to an external diameter of each outer periphery. Assume that the external diameter of the first outer periphery 13 is D1, the external diameter of the second outer periphery 14 is D2, and an external diameter of an optical surface of the lens 1 on the opposite side of the first contact portion 15 with respect to the second outer periphery 14 in the direction parallel to the optical axis 1000 is D3. In this case, the external diameters D1 to D3 satisfy a conditional expression of D1>D2>D3>0. In other words, in one embodiment the external diameter of the second outer periphery 14 be smaller than the external diameter of the first outer periphery 13, and larger than the smaller one of an external diameter of a first optical surface of the lens 1 and an external diameter of a second optical surface of the lens 1. This is because, as the fitting portion of the holding frame 4 is farther away from the pressed portion 17 of the holding frame 4, to which an external force is applied, in the direction orthogonal to the optical axis 1000, impact of the external force on the lens 1 can be more reduced. This is also because, as the fitting portion of the holding frame 4 is farther away from the optical surface having the smaller external diameter in the same direction, impact of the external diameter on the optical surface can be more reduced or vignetting of light incident on the lens 1 can be more suppressed. A displacement amount of a first portion (18) of the holding frame 4 facing the first outer periphery 13 and a displacement amount of a second portion of the holding frame 4 facing the second outer periphery 14 in a case where a force is applied to the pressed portion 17 of the holding frame 4 under specific conditions have been obtained by simulation. The result indicates that the displacement amount of the first portion (18) is 6.3 µm, and the displacement amount of the second portion is 5.4 µm. In this manner, according to the present exemplary embodiment, a deformation amount of the fitting portion of the holding frame 4 can be reduced. In the present exemplary embodiment, a part of the first contact portion 15 and a part of the second contact portion 16 have equal diameters with respect to the optical axis 1000. This can reduce deformation (change in curvature) of the surface of the lens 1 at the second contact portion 16 when the holding frame 4 holds the lens 1 with the retaining member 6. For example, in a case where the first contact portion 15 is arranged at a position closer to the optical axis 1000 than the second outer periphery 14 in the direction orthogonal to the optical axis 1000, no parts of the first contact portion 15 and the second contact portion 16 have equal diameters with respect to the optical axis 1000. In this case, when the holding frame 4 holds the lens 1 while the retaining member 6 urges the lens 1, an excessively large deformation (curvature change) can occur in the second contact portion 16 of the lens 1. Therefore, the present exemplary embodiment can provide a lens apparatus that is advantageous in that, for example, the structure is simple, the size is compact, and the optical performance is stable.

Figure 4:
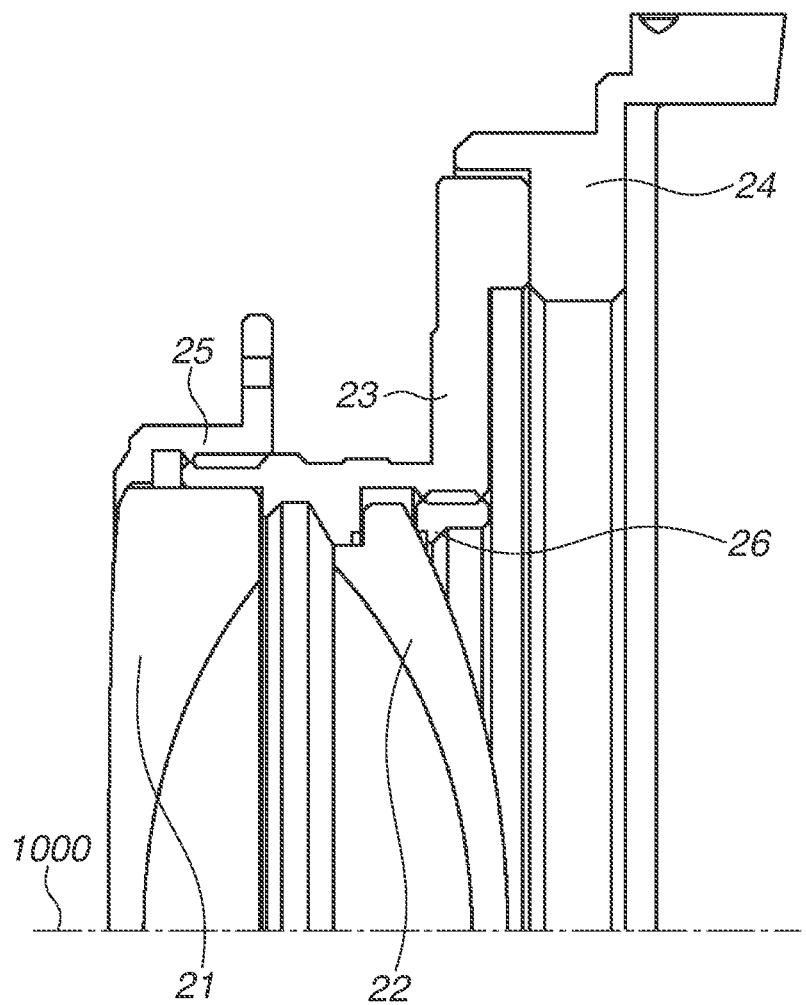
FIG. 4 is a sectional view illustrating a main part of a lens apparatus according to a second exemplary embodiment.
Figure 5:
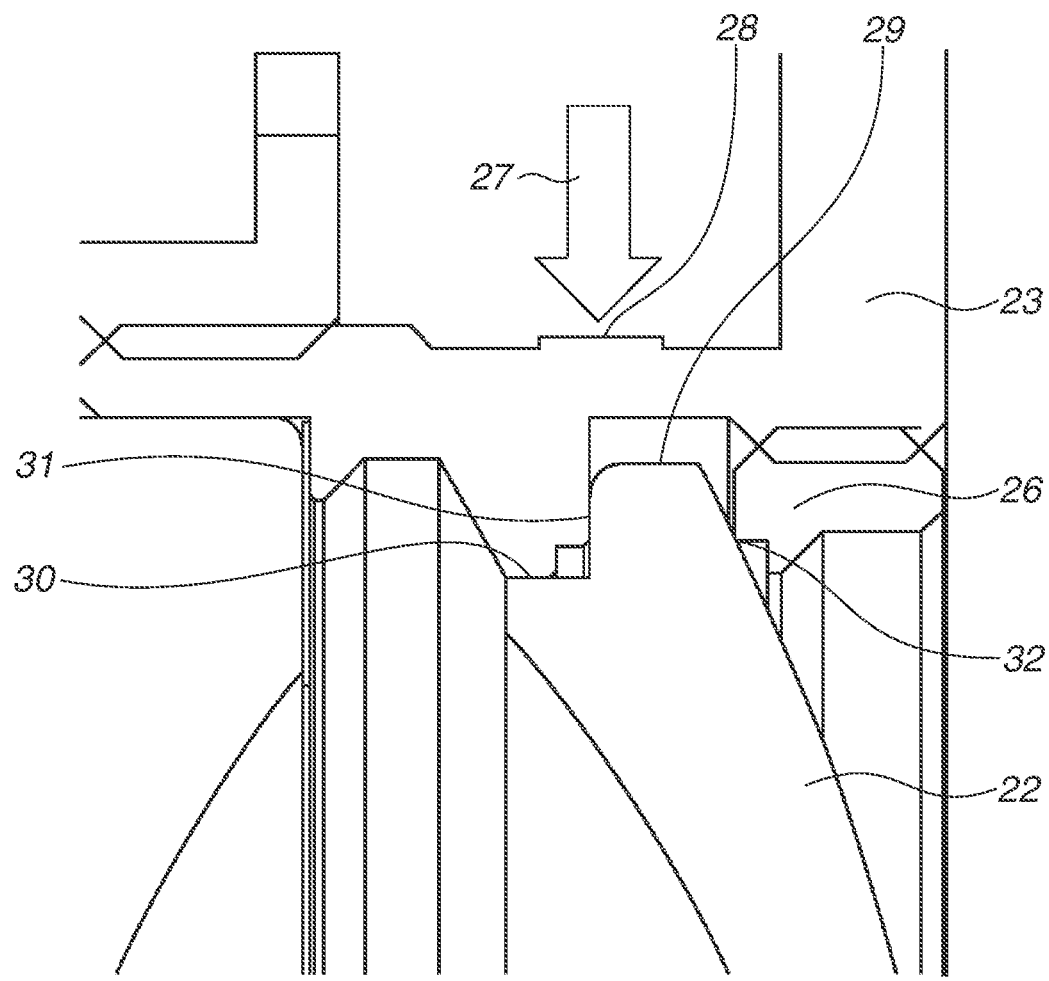
FIG. 5 is an enlarged view of a portion including a holding member in the main part of the lens apparatus according to the second exemplary embodiment.
Figure 6:
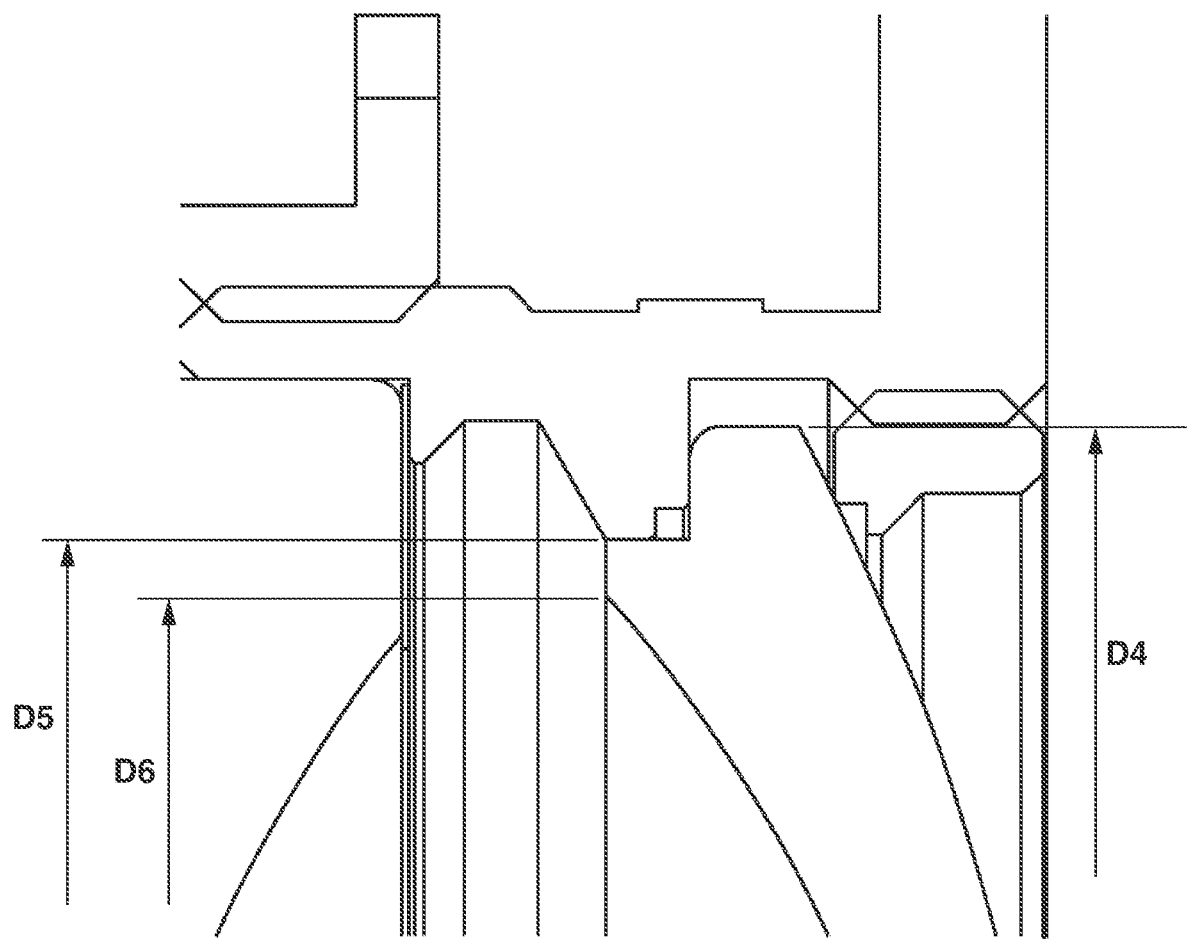
FIG. 6 is a sectional view illustrating a conditional expression with respect to an external diameter of each outer periphery according to the second exemplary embodiment.

A lens apparatus according to a second exemplary embodiment will be described with reference to FIGS. 4 to 6. FIG. 4 is a sectional view illustrating a main part of the lens apparatus according to the present exemplary embodiment. FIG. 5 is an enlarged view of a portion including a holding member in the main part of the lens apparatus according to the present exemplary embodiment. FIG. 6 is a sectional view illustrating a conditional expression with respect to an external diameter of each outer periphery. FIG. 4 illustrates lenses 21 and 22, and a holding frame 23 (also referred to as a holding member) that holds the lenses 21 and 22. The lenses 21 and 22 are each fitted to a fitting portion of the holding frame 23. Retaining members 25 and 26 are screwed to the holding frame 23, and retain the lenses 21 and 22, respectively. The lenses 21 and 22 are held by the holding frame 23 while being retained (while being urged against the holding frame 23) by the retaining members 25 and 26, respectively, in the direction parallel to the optical axis 1000. The holding frame 23 is fixed to a moving barrel 24, for example, with screws. The moving barrel 24 is connected to a driving structure including, for example, a cam or a helicoid, and is driven by the driving structure in a direction along the optical axis 1000. The moving barrel 24 is driven, for example, for zooming (zoom adjustment) or focusing (focus adjustment) in the lens apparatus.

In FIG. 5, the lens 22 fitted to the fitting portion of the holding frame 23 includes a first outer periphery 29 and a second outer periphery 30. The lens 22 further includes a first contact portion 31 and a second contact portion 32. The first contact portion 31 is in contact with the holding frame 23 while being pressed against the holding frame 23 (the holding member) by the retaining member 26. The second contact portion 32 is in contact with the retaining member 26. In a direction orthogonal to the optical axis 1000 of the lens 22, the first outer periphery 29, the first contact portion 31, and the second contact portion 32 are arranged farther away from the optical axis 1000 than the second outer periphery 30. The holding frame 23 is fitted to the second outer periphery 30 of the lens 22, and holds the lens 22 so as not to be in contact with the first outer periphery 29 of the lens 22. In addition, the holding frame 23 is configured to be adjustable in position with respect to the moving barrel 24 in the direction orthogonal to the optical axis 1000. This enables eccentricity adjustment of a lens unit (the lenses 21 and 22). For the eccentricity adjustment, an outer periphery of the holding frame 23 includes, for example, pressed portions 28 (second pressed portions) as cylindrical protruding portions, at four locations on a circumference about the optical axis 1000. More specifically, the holding frame 23 includes the second pressed portions configured to be pressed in the direction toward the optical axis 1000 in the direction orthogonal to the optical axis 1000, by a tool to be attached to the outside of the holding frame 23 in order to perform eccentricity adjustment of the holding frame 23. Pressing the pressed portions 28 (the second pressed portions) along a direction indicated by an arrow 27 with the adjustment tool enables the eccentricity adjustment of the holding frame 23 (the lenses 21 and 22). The eccentricity adjustment causes an external force in the direction orthogonal to the optical axis 1000 to be applied to the pressed portions 28, and the external force deforms the holding frame 23. The deformation (distortion) of the holding frame 23 deforms (distorts) the lens 22. The deformation of the lens 22 is disadvantageous in eccentricity adjustment of the holding frame 23 (the lenses 21 and 22).

Assume that an external diameter of the first outer periphery 29 is D4, an external diameter of the second outer periphery 30 is D5, and an external diameter of an optical surface of the lens 22 on the opposite side of the first contact portion 31 with respect to the second outer periphery 30 in the direction parallel to the optical axis 1000 is D6. In this case, the external diameters D4 to D6 satisfy a conditional expression of D4>D5>D6>0. In other words, the external diameter of the second outer periphery 30 be smaller than the external diameter of the first outer periphery 29, and lager than the smaller one of an external diameter of a first optical surface of the lens 22 and an external diameter of a second optical surface of the lens 22. This is because, as the fitting portion of the holding frame 23 is farther away from the pressed portions 28 of the holding frame 23, to which an external force is applied, in the direction orthogonal to the optical axis 1000, impact of the external force on the lens 22 can be more reduced. This is also because, as the fitting portion of the holding frame 23 is farther away from the optical surface having the smaller external diameter in the same direction, impact of the external force on the optical surface can be more reduced or vignetting of light incident on the lens 22 can be more suppressed. According to the present exemplary embodiment, also for the lens subject to the eccentricity adjustment, a deformation amount of the fitting portion of the holding frame due to the external force can be reduced, and a deformation amount of the lens can thus be reduced.

In addition, in the present exemplary embodiment, a part of the first contact portion 31 and a part of the second contact portion 32 have equal diameters with respect to the optical axis 1000. This can reduce deformation (change in curvature) of the surface of the lens 22 at the second contact portion 32 when the holding frame 23 holds the lens 22 with the retaining member 26. For example, in a case where the first contact portion 31 is arranged at a position closer to the optical axis 1000 than the second outer periphery 30 in the direction orthogonal to the optical axis 1000, no parts of the first contact portion 31 and the second contact portion 32 have equal diameters with respect to the optical axis 1000. In this case, when the holding frame 23 holds the lens 22 while the retaining member 26 urges the lens 22, an excessively large deformation (surface deformation or curvature change) can occur in the second contact portion 32 of the lens 22. Therefore, the present exemplary embodiment can provide a lens apparatus that is advantageous in that, for example, the structure is simple, the size is compact, and the optical performance is stable.

Each of the lens apparatuses according to the first and second exemplary embodiments could have a configuration such as one of the following configurations 1 to 3. The configuration 1 is that the first outer periphery and the pressed portion partially overlap with each other in the direction parallel to the optical axis. When the configuration 1 is employed, the first outer periphery and the pressed portion are close to each other, compared to when the configuration 1 is not employed. Hence, the fitting portion is not fitted to the lens at the first outer periphery. The configuration 2 is that the second outer periphery and the pressed portion partially overlap with each other in the direction parallel to the optical axis. When the configuration 2 is employed, the second outer periphery and the pressed portion are close to each other, compared to when the configuration 2 is not employed. Hence, the fitting portion is fitted to the lens at the second outer periphery while the second outer periphery is arranged closer to the optical axis (farther away from the pressed portion) than the first outer periphery. The configuration 3 is that, in the direction parallel to the optical axis, one end of the fitting portion, which is fitted to the holding member, at the second outer periphery overlaps with the pressed portion, whereas the other end of the fitting portion does not overlap with the pressed portion. When the configuration 3 is employed, the fitting portion and the pressed portion are far from each other, compared to when the configuration 3 is not employed. As a result, a deformation amount of the fitting portion due to the external force applied to the pressed portion, i.e., a deformation amount of the lens can be reduced.

The lens apparatus according to the first exemplary embodiment could have a configuration such as the following configuration 4. The configuration 4 is that, the fitting portion and the pressed portion do not include portions located at the same position in the direction parallel to the optical axis. In the direction parallel to the optical axis, the fitting portion fitted to the holding member at the second outer periphery does not overlap with the pressed portion. When the configuration 4 is employed, the fitting portion and the pressed portion are far from each other, compared to when the configuration 4 is not employed (which includes when the configuration 3 is employed). Hence, the deformation amount of the fitting portion due to the external force applied to the pressed portion, i.e., the deformation amount of the lens can be reduced (compared to when the configuration 3 is employed).

Figure 7:
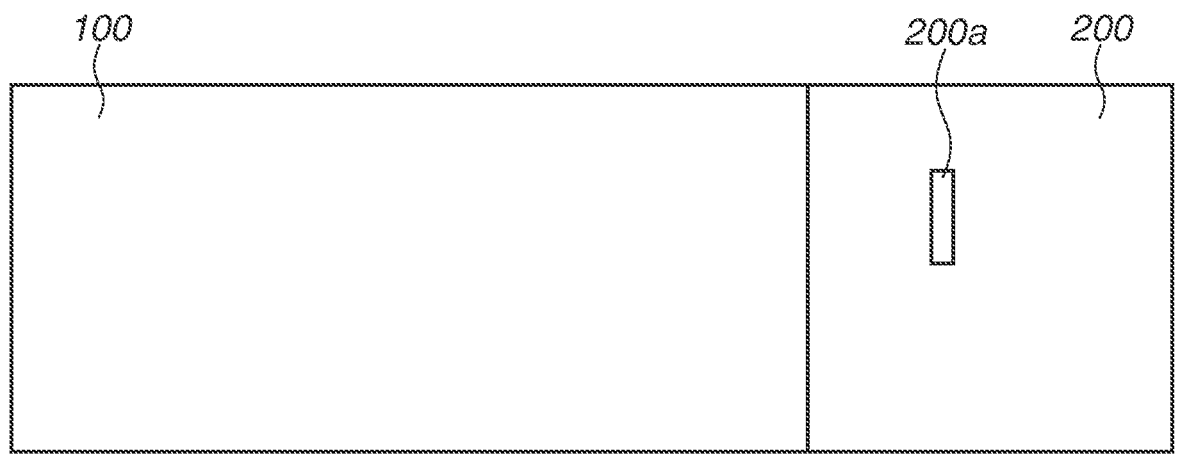
FIG. 7 is a diagram illustrating a configuration example of an image pickup apparatus according to a third exemplary embodiment.

A third exemplary embodiment regarding an image pickup apparatus will be described. FIG. 7 is a diagram illustrating a configuration example of an image pickup apparatus according to the present exemplary embodiment. The image pickup apparatus includes a lens apparatus 100 including the main part of any of the above-described lens apparatuses, and an image sensor (also referred to as an image pickup element) 200*a* (included in an image pickup apparatus main body (or a camera apparatus main body) 200) that captures an image formed by the lens apparatus 100. In this case, the lens apparatus 100 may be an apparatus exchangeably mounted on the image pickup apparatus main body 200, or may be another apparatus. The image pickup apparatus according to the present exemplary embodiment exhibits the above-described advantageous effects regarding the lens apparatus.

While the exemplary embodiments of the disclosure have been described above, the disclosure is not limited to these exemplary embodiments, and various modifications and changes can be made without departing from the gist of the disclosure. For example, the disclosure is not limited to the lens apparatus according to the first exemplary embodiment or the lens apparatus according to the second exemplary embodiment. A lens apparatus having both of at least part of the configuration of the lens apparatus according to the first exemplary embodiment and at least part of the configuration of the lens apparatus according to the second exemplary embodiment may be used.

The exemplary embodiments of the disclosure can provide a lens apparatus that is advantageous in that, for example, the structure is simple, the size is compact, and the optical performance is stable.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-149590, filed Sep. 7, 2020, which is hereby incorporated by reference herein in its entirety.

What is claimed is:

1. An apparatus comprising:
a lens;
a holder; and
a retainer,
wherein the lens is held with the lens being pressed against the holder by the retainer in a direction parallel to an optical axis of the lens,
wherein the lens includes a first outer periphery, a second outer periphery, a first contact portion in contact with the holder, and a second contact portion in contact with the retainer,
wherein in a direction orthogonal to the optical axis, the first outer periphery, the first contact portion and the second contact portion are arranged farther away from the optical axis than the second outer periphery,
wherein the holder is configured to hold the lens such that the holder is fitted to the second outer periphery and is not in contact with the first outer periphery, and
wherein the holder includes a first pressed portion configured to be pressed toward a direction orthogonal to the optical axis by a pressing member in an accessory to be attached to an outside of the holder, and
wherein the accessory urges the pressing member against the first pressed portion including a recessed portion in the holder.

2. The apparatus according to claim 1, wherein an external diameter of the second outer periphery is larger than a smaller one of a diameter of a first optical surface of the lens and a diameter of a second optical surface of the lens.

3. The apparatus according to claim 1, wherein the first contact portion and the second contact portion have respective portions whose diameters with respect to the optical axis equal to each other.

4. The apparatus according to claim 1, wherein the first pressed portion includes a groove portion.

5. The apparatus according to claim 1, wherein the holder includes a second pressed portion configured to be pressed in a direction toward the optical axis in the direction orthogonal to the optical axis by a tool to be attached to an outside of the holder in order to perform eccentricity adjustment of the holder.

6. The apparatus according to claim 5, wherein the second pressed portion includes a protruding portion.

7. The apparatus according to claim 1, wherein the first outer periphery and the first pressed portion have respective portions which overlap with each other in the direction parallel to the optical axis.

8. The apparatus according to claim 1, wherein the second outer periphery and the first pressed portion have respective portions which overlap with each other in the direction parallel to the optical axis.

9. The apparatus according to claim 1, wherein in the direction parallel to the optical axis, one end of a fitting portion fitted to the holder in the second outer periphery overlaps with the first pressed portion, and the other end of the fitting portion does not overlap with the first pressed portion.

10. The apparatus according to claim 1, wherein in the direction parallel to the optical axis, a fitting portion fitted to the holder in the second outer periphery does not overlap with the first pressed portion.

11. An image pickup apparatus comprising:
the apparatus of claim 1; and
an image pickup element configured to pick up an image formed by the apparatus.

12. The image pickup apparatus according to claim 11, wherein an external diameter of the second outer periphery is larger than a smaller one of a diameter of a first optical surface of the lens and a diameter of a second optical surface of the lens.

13. The image pickup apparatus according to claim 11, wherein the first contact portion and the second contact portion have respective portions whose diameters with respect to the optical axis equal to each other.

14. The image pickup apparatus according to claim 11, wherein the holder includes a first pressed portion configured to be pressed in a direction toward the optical axis in the direction orthogonal to the optical axis by a pressing member in an accessory to be attached to an outside of the holder.

15. The image pickup apparatus according to claim 11, wherein the holder includes a second pressed portion configured to be pressed in a direction toward the optical axis in the direction orthogonal to the optical axis by a tool to be attached to an outside of the holder in order to perform eccentricity adjustment of the holder.

* * * * *